July 21, 1953 L. M. SIGLER 2,646,163
DUMPING AND WASHING MECHANISM FOR EGG SEPARATING CUPS
Filed Nov. 25, 1949 3 Sheets-Sheet 1

INVENTOR.
LAWRENCE M. SIGLER,
BY: Harold B. Hood.
ATTORNEY.

July 21, 1953 L. M. SIGLER 2,646,163
DUMPING AND WASHING MECHANISM FOR EGG SEPARATING CUPS
Filed Nov. 25, 1949 3 Sheets-Sheet 2

INVENTOR.
LAWRENCE M. SIGLER,
BY: Harold B. Hood.
ATTORNEY.

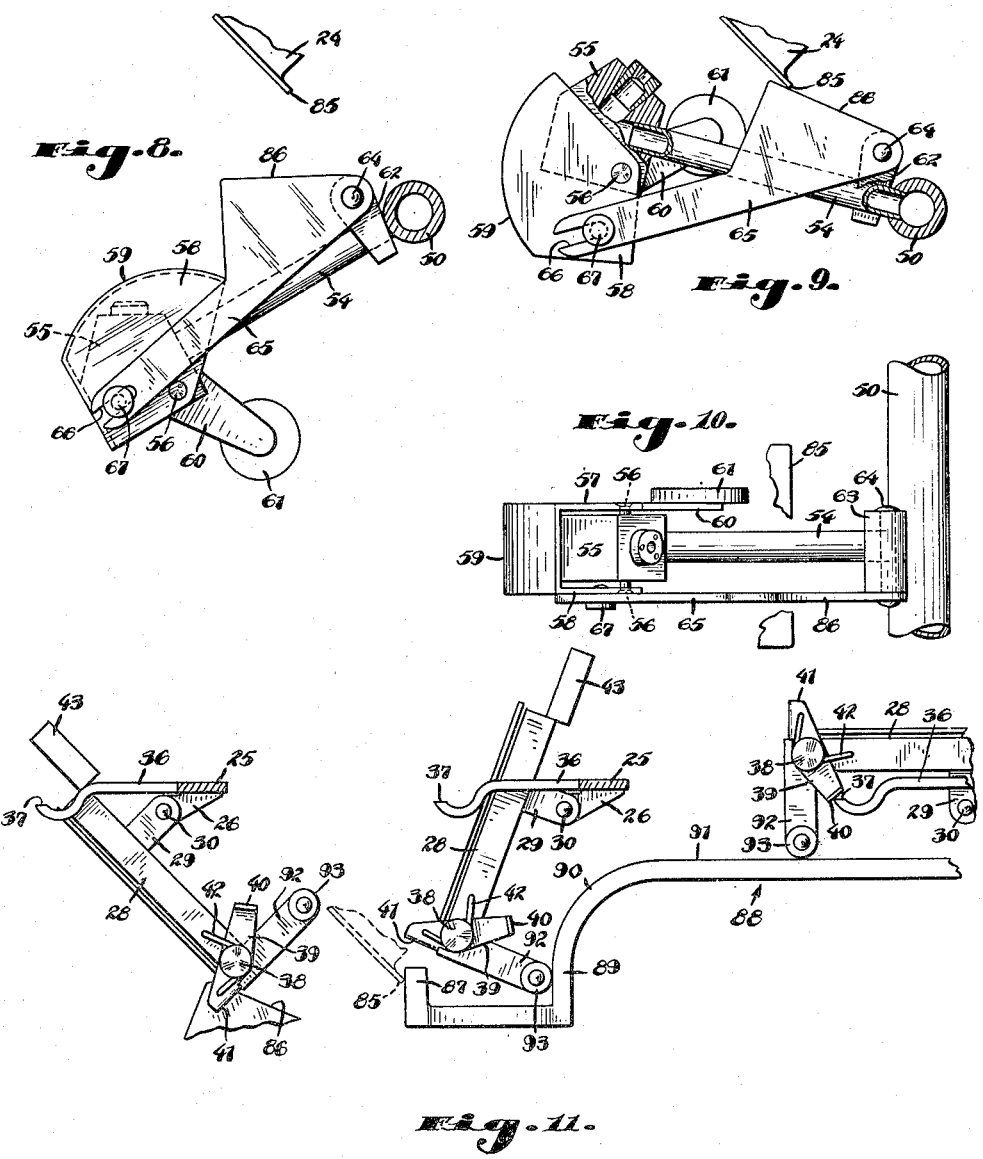

Patented July 21, 1953

2,646,163

UNITED STATES PATENT OFFICE 2,646,163

DUMPING AND WASHING MECHANISM FOR EGG SEPARATING CUPS

Lawrence M. Sigler, Washington, D. C.

Application November 25, 1949, Serial No. 129,288

17 Claims. (Cl. 198—229)

1

The present invention relates to egg separating machines, and is primarily concerned with the provision of improved means for dumping individual separating cups and for washing such cups. More specifically, in the use of such machines, it has been found that frequently the yolk of an egg will be broken when it is dropped, by the breaking machine, into a separating cup. If such a cup containing an egg in that condition is allowed to progress to the separating station, at least a part of the broken yolk will be discharged, along with the egg white, into the egg-white receiver; and the presence of yolk material in egg white, even in very small percentages, will interfere with whipping the whites to the consistency required by bakers and other users. It is customary, therefore, to station an operator between the breaking machine and the point at which the separating devices are actuated, to remove from the machine any cup containing an egg whose yolk has been broken. Such an operation involves, of course, the replacement, on the conveyor, of the cup or tray so removed, or of a new cup or tray to take its place; and such replacement must be effected before the rank of cups from which one has been removed again reaches the breaking station. In practice, it has been found that such an operation is inefficient and time wasting, and that occasionally, a cup cannot be replaced in time, so that the machine has to be stopped and the cup replaced before the involved rank of cups next passes the breaking station.

It is a primary object of the invention, then, to revise egg separating machines heretofore known in such a fashion as to permit the operator merely to tilt, to liquid-discharging position, any cup or tray containing an egg with a broken yolk. It has been found that, at least in some instances, broken yolk material will adhere to a cup, even when so tilted; and therefore I consider it desirable to provide means for washing the interior of any such cup, after its contents have been substantially discharged.

In machines of the character here under consideration, the egg separating cups are customarily arranged in transverse ranks and longitudinally extending files. According to the present invention, a washing station is provided, including a plurality of liquid-discharging nozzles, one for each file of cups or trays. It is an object of the invention to provide means whereby, each time a rank of cups reaches the washing station, a single valve means, controlling fluid flow to all of such nozzles, will be automatically

2 opened; but whereby liquid will be delivered against only such cups of that rank as may currently be in liquid-discharging position.

A further object of the present invention is to provide automatic means, beyond the washing station, for returning to liquid-retaining position, any cup or tray which may pass the washing station in liquid-discharging position.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 8 is a fragmental, longitudinal sectional view through the washing mechanism, a fragment of an egg separating cup, in liquid-discharging position, being shown, and the washing unit being shown in retracted position;

Fig. 9 is a view similar to Fig. 8, but illustrating the washing unit in active position;

Fig. 10 is a plan view of the mechanism shown in Fig. 9; and

Fig. 11 is a more or less diagrammatic view, showing one cup of each of three successive ranks of cups, and illustrating the means whereby the inverted cups are returned to liquid-retaining positions.

Figure 1:
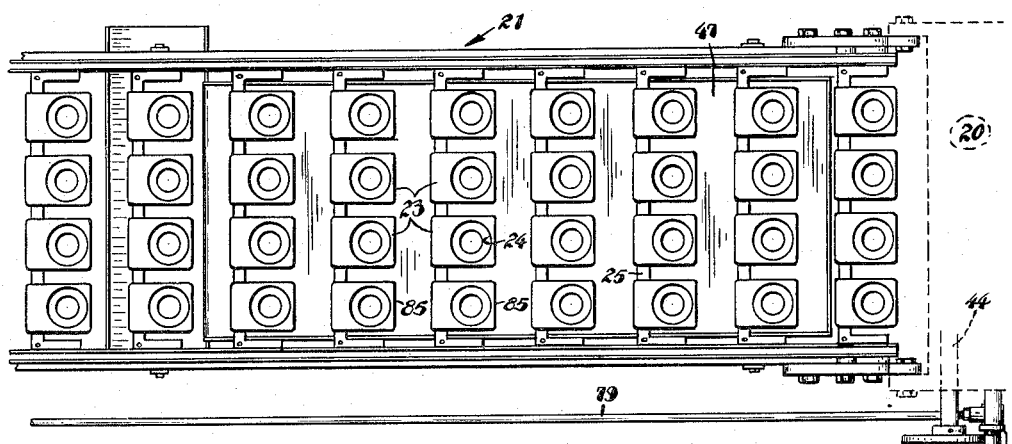
Fig. 1 is a plan view of the receiving end of an egg separating machine constructed in accordance with my invention.
Figure 3:
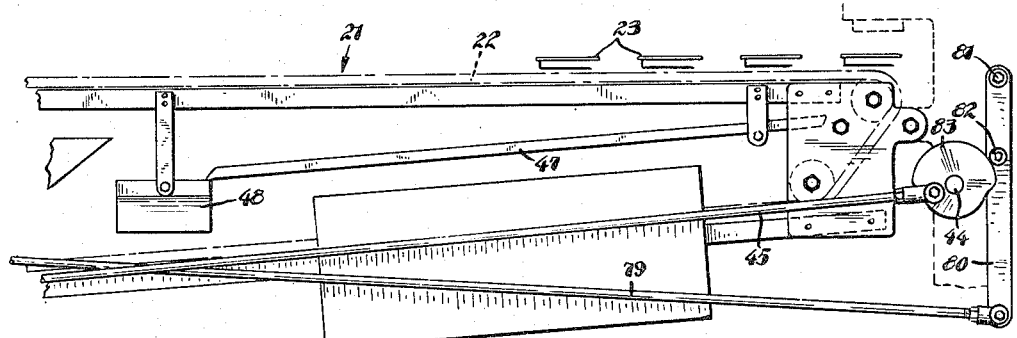
Fig. 3 is a side elevation of the receiving end of such machine.

Referring more particularly to the drawings, it will be seen that, in Figs. 1 and 3, I have more or less diagrammatically indicated an egg breaking machine 20 of standard construction, with which is associated a separating machine 21. The machine 21 comprises a frame upon which is supported an endless conveyor 22 carrying a multiplicity of trays 23 arranged in ranks extending transversely of the line of movement of the conveyor and in files extending in the line of movement of the conveyor. Each tray is provided with a cup 24 so constructed as to be operable to separate the white from the yolk of an egg deposited in the cup by the machine 20. The cupped trays 23 and the means for actuating the separating devices form no part of the present invention, and therefore are neither described nor illustrated herein in detail.

A multiplicity of bars or brackets 25 will be secured to the conveyor elements 22, suitably spaced longitudinally thereof and, in the illustrated embodiment of the invention, each such bar supports four tray-carrying frames, arranged in a transverse rank. For each such frame, the bar 25 is provided with a pair of ears 26 and 27. Each frame comprises a side element 28 having a downturned ear 29 pivoted at 30 upon an ear 26, a second element 31 having a downturned ear 32 pivoted at 33 upon an ear 27, and a bridging element 34 joining said elements 28 and 31. The element 34 carries latch means 35 whereby a tray 23 may be secured to the frame.

Figures 5, 6:
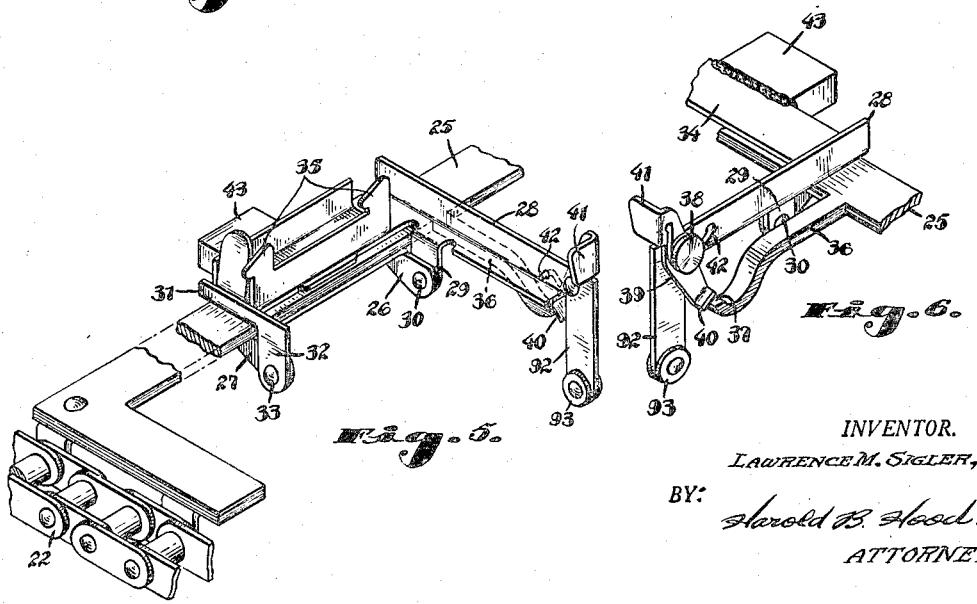
Fig. 5 is an enlarged perspective view of a tray-carrying frame, showing the manner in which such frame is secured to the conveyor.
Fig. 6 is a fragmental perspective view of the latch mechanism whereby each such frame is normally held in a position corresponding to liquid-retaining position of its supported cup or tray.

Projecting rearwardly from the bar 25 adjacent each frame element 28 is a latch finger 36 formed to provide a toe 37 presented generally upwardly. Upon a pin 38 fixed to each frame element 28 there is pivotally mounted a latch lever 39 one arm of which terminates in a laterally turned toe 40 adapted normally to engage the toe 37 of the finger 38. The opposite arm of the lever 39 is provided with a finger piece 41, and spring means 42 normally holds the latch lever 39 in the position in which it is shown in Figs. 5, 6 and 11. It will be obvious that, if the lever 39 is swung in a clockwise direction about its pin 38, the toe 40 will be disengaged from the toe 37, whereby the tray-carrying frame will be permitted to swing, in a counter-clockwise direction as viewed in Figs. 6 and 11. A weight 43 is preferably secured to the bar 34 to locate the center of gravity of the frame and tray assembly at a point between the axis of the pivots 30 and 33 and the trailing edge of the assembly, but closer to said pivotal axis so that, when the latch lever 39 is disengaged, the frame and tray assembly will swing substantially to the position illustrated at the left hand end of Fig. 11.

Whenever an operator, stationed in the region illustrated in Figs. 1 and 3, notes an egg whose yoke has been broken in one of the cups 24, the operator will actuate the lever 39 of the corresponding frame to swing the cup to the position illustrated at the left hand end of Fig. 11. The egg contained therein will thus be discharged into the chute 47 and thence to a transverse chute 48 which leads to a collecting container for such eggs. Eggs collected from these chutes find a ready market, after freezing, as whole eggs.

A main drive shaft is indicated at 44, and a pitman 45, driven from said shaft, connects with a step-by-step drive mechanism indicated generally by the reference numeral 46, such mechanism being connected to drive the conveyor 22.

Immediately in advance of the separating station, I provide a cup washing station, indicated generally by the reference numeral 49. At such station, there is located a header 50 mounted transversely of the machine for oscillation about its own axis, and supplied, by suitable conduit means 51, controlled by valve means 52, with washing liquid from any suitable source.

Supported upon, and communicating with the header 50 I provide, in the illustrated embodiment of my invention, four washing nozzle assemblies, indicated by the reference numeral 53, one arranged in registry with each file of trays 23. Since the four nozzle assemblies are identical, only one has been illustrated in detail, and only one will be described.

As is clearly shown in Figs. 8, 9 and 10, each such assembly comprises a tube 54 projecting substantially radially from the header 50, and carried thereby. At its outer end, the tube 54 carries a spray unit or nozzle 55 which is provided with oppositely projecting trunnion pins 56. A mask or shield, having side plates 57 and 58 pivotally mounted on the pins 56, comprises an arcuate wall 59, an extension 60 of the side plate 57 carrying a counterweight 61 which normally resiliently retains the wall 59 in the position of Fig. 8 in which it overlies, and therefore masks, the discharge port of its nozzle unit.

Near its inner end, the tube 54 carries a bracket 62 terminating in a bearing 63 in which is received a pivot pin 64 upon which is pivotally mounted one end of a lever 65. The opposite end of said lever 65 is bifurcated as at 66 to straddle a headed pin 67 projecting from the mask wall 58 at a point eccentric with respect to the trunnion pins 56. Obviously, counterclockwise movement of the lever 65 about its pivotal mounting 64 will swing the mask 59 in a counter-clockwise direction about its pivotal axis 56, to the position illustrated in Fig. 9.

Figure 2:
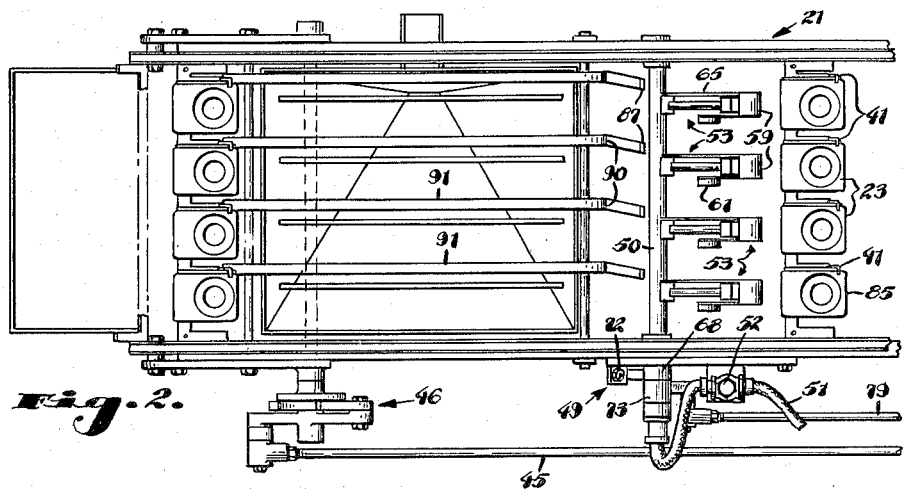
Fig. 2 is a similar view of the discharge end of such machine.

A lever 68 (Fig. 2) is fixed to the header 50, and comprises a pair of angularly related arms 69 and 70. The arm 69 is adapted to vibrate between oppositely located, adjustable stops 71 and 72, to limit the range of oscillation of the header 50 carrying the spray units 53.

A second lever 73 is journal mounted to oscillate about the axis of the header 50 and comprises a pair of angularly related arms 74 and 75. A pin 76, fixed to the arm 75 of the lever 73, penetrates an opening in the arm 70 of the lever 68, a spring 77 being confined between the arms 75 and 70, and a nut 78 being mounted upon the projecting end of the pin 76 to limit separation of the arms 75 and 70. A link 79 connects the lever arm 75 with a lever 80 (Fig. 3) pivotally mounted at 81 and carrying a roller 82 operatively engaging a cam 83 mounted on the drive shaft 44. Obviously, as the cam 83 rotates, the lever 80 will be oscillated, to oscillate the lever 73. As the lever arm 75 moves in a clockwise direction as viewed in Fig. 4, the spring 77 will expand to retain the lever 68 in its illustrated position, during initial movement of the arm 75. When the nut 78 comes into engagement with the arm 70, the lever 68 will begin to partake of the movement of the lever 73, whereby the header 50 will be swung in a clockwise direction as viewed in Fig. 4 to move the spray assemblies 53 out of the paths of the trays 23. The parts are so synchronized that the conveyor 22 will be advanced after the spray assemblies have been so shifted, to bring a new rank of trays 23 into registry with the washing station.

Now, as the lever arm 75 is swung in a counter-clockwise direction, the spring 77, resiliently maintaining engagement between the lever arm 70 and the stop nut 78, will cause the lever 68 and the header 50 to swing in a counter-clockwise direction, to move the spray assemblies 53 upwardly into the relative positions illustrated in Fig. 9. When the lever arm 69 strikes the stop 71, movement of the header 50 will, of course, be arrested; but the lever 73 continues to move in a counter-clockwise direction, its arm 74 thereupon engaging the stem 84 of the valve means 52 to open said valve means.

Figure 4:
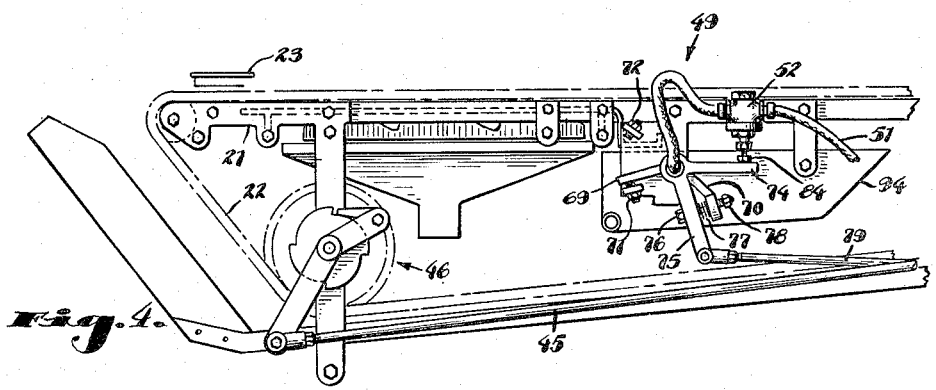
Fig. 4 is a similar view of the discharge end of the machine.
Figure 7:
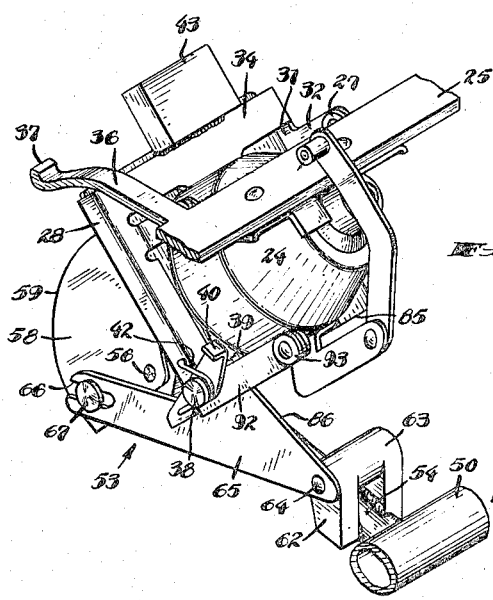
Fig. 7 is a perspective view of a frame, carrying a tray, and in liquid-discharging position, shown at the washing station.

If all of the trays of the rank currently located at the washing station are in liquid-retaining position, all of the masks 59 will remain in the relative positions illustrated in Fig. 8, so that, although washing liquid will be supplied to, and will flow through, all of the nozzles 55, none of such liquid will be delivered against any tray, but all of it will be deflected by the masks into the suitably drained trough 94 (Fig. 4). If, however, one or more trays of the rank currently in registry with the washing station are currently in the position illustrated at the left end of Fig. 11 and indicated in Figs. 3, 9 and 10, the surface 86 of the lever 65 of that washing assembly currently registering with such cup will, as the washing assembly rises, strike the trailing edge 85 of that tray, and movement of the lever 65 will thereby be arrested as the tube 54 continues to swing in a clockwise direction as viewed in Figs. 8 and 9. Thereby, the mask 59 associated with that particular nozzle will be retracted to the position of Fig. 9; and, when the valve stem 84 is depressed to supply washing liquid to the spray assemblies, liquid will be discharged through that nozzle against the interior surface of the associated cup 24 to clear the same of adhering material.

It is particularly to be noted that such withdrawal of the mask occurs before the lever arm 69 strikes the stop 71, and therefore before the lever arm 74 engages the stem 84 to open the valve means 52. Correspondingly, initial clockwise movement of the lever 73 permits closure of the valve means 52 (the stem 84 being spring urged to closed position) before the stop nut 78 comes into engagement with the lever arm 70 to begin retractive swinging movement of the header 50 which will result in return of the mask 59, under the influence of its counterweight 61, to masking relation with its nozzle.

After such retractive movement of the header 50 has been completed, the mechanism 46 will again move the conveyor 22 forward. A trackway 88, for each file of cups, comprises a lip 87 which will promptly be engaged by the edge 85 of any inverted tray, to swing such tray substantially into the position occupied by the intermediate tray illustrated in Fig. 11. Each tray-carrying frame is provided, adjacent its trailing edge, with a depending leg 92 carrying, at its free end, a roller 93. The trackway 88 further comprises a vertical section 89 which will be engaged by the roller 93 as the edge 85 leaves the lip 87; and said section 89 merges, through a curved section 90, with a horizontal section 91 of the trackway 88 so that, as the conveyor moves forwardly, the roller 93 will follow the sections 89, 90 and 91 to return the tray 23 to liquid-retaining position, as indicated at the right hand end of Fig. 11. As the roller 93 attains the section 91 of the trackway 88, the latch lever 39 will engage the toe 37 of the finger 36, in the manner illustrated in Fig. 11 to hold its tray in liquid-retaining position until such latch lever is again actuated by the operator.

I claim as my invention:

1. In a machine of the class described, an endless conveyor, means for driving said conveyor, a plurality of cupped trays supported on said conveyor for movement therewith, hinge means for each tray located upon an axis transverse to the line of movement of said conveyor, fixed relative to said conveyor and supporting its tray for free oscillation about said axis, and latch means for each tray normally cooperating with said hinge means to hold such tray in a predetermined position relative to said conveyor, the center of gravity of each tray being located to the rear of its hinge axis but closer to a vertical plane including such axis than to the trailing end of such tray.

2. In a machine of the class described, in combination, an endless conveyor, means for driving said conveyor, a plurality of cupped trays supported on said conveyor for movement therewith, hinge means for each tray located upon an axis fixed relative to said conveyor and supporting its tray for oscillation about said axis, latch means for each tray normally cooperating with said hinge means to hold such tray in a predetermined position relative to said conveyor, a spray unit including an oscillable shaft, a spray nozzle supported from said shaft, means for oscillating said shaft to swing said nozzle into and out of the path of movement of said trays, and valve means for controlling flow of liquid through said spray nozzle.

3. The combination of claim 2 in which, when said spray nozzle is disposed in the path of movement of said trays, it is located in coactive registry with one of said trays, and including means for opening said valve means after said spray nozzle reaches such registry and for closing said valve means before said spray nozzle departs from such registry.

4. In a machine of the class described, an endless conveyor, means for driving said conveyor, a plurality of cupped trays supported on said conveyor and arranged thereon in a plurality of ranks, each rank of trays extending transversely of the line of movement of said conveyor and being spaced from each adjacent rank in the direction of such line, and the trays further being arranged in a plurality of files extending in the direction of such line, hinge means for each tray located upon an axis fixed relative to said conveyor and supporting its tray for independent oscillation about said axis, latch means for each tray normally cooperating with said hinge means to hold said tray in liquid-retaining position, said tray being shiftable about said hinge means, upon release of said latch means, to a liquid-discharging position, and means for washing the cupped portions of said trays comprising a header, a plurality of spray nozzles connected with and supplied from said header, one for each file of trays and disposed in registry therewith, means for shifting said spray nozzles into and out of the paths of said trays, and valve means for controlling flow of fluid to said header and so through said spray nozzles.

5. In a machine of the class described, an endless conveyor, means for driving said conveyor, a plurality of cupped trays supported on said conveyor and arranged thereon in a plurality of ranks, each rank of trays extending transversely of the line of movement of said conveyor and being spaced from each adjacent rank in the direction of such line, and the trays further being arranged in a plurality of files extending in the direction of such line, hinge means for each tray located upon an axis fixed relative to said conveyor and supporting its tray for independent oscillation about said axis, latch means for each tray normally cooperating with said hinge means to hold said tray in liquid-retaining position, said tray being shiftable about said hinge means, upon release of said latch means, to a liquid-discharging position, means for washing the cupped portions of said trays comprising a header, a plurality of spray nozzles connected with and supplied from said header, one for each file of trays and disposed in registry therewith, means for shifting said spray nozzles into and out of the paths of said trays, each spray nozzle being located, when said nozzles are disposed in the paths of said trays, in coactive registry with a tray of a common rank, valve means for controlling flow of fluid to said header and so through said spray nozzles, and means for opening said valve means after said nozzles reach such registry and for closing said valve means before said nozzles depart from such registry.

6. The machine of claim 5 including a mask for each spray nozzle movable into and out of masking association with its nozzle, and means, controlled by the position of the tray currently in operative association with each nozzle, for shifting such mask out of masking relation with a nozzle, only when such tray is in liquid-discharging position, before opening of said valve means, and for returning said mask to masking relation with its nozzle after closing of said valve means.

7. The machine of claim 6 in which said driving means produces a step-by-step movement of said conveyor providing a dwell in the progress of said conveyor during the period when said valve means is open.

8. In a machine of the class described, an endless conveyor, means for driving said conveyor, a plurality of trays independently supported on said conveyor for movement therewith, hinge means for each tray located upon an axis fixed relative to said conveyor and supporting its tray for oscillation about such axis, latch means for each tray normally cooperating with said hinge means to hold such tray in a predetermined position relative to said conveyor but retractable to permit swinging movement of said tray about said axis to a new position, and stationary track means adjacent the path of said trays cooperable with any tray disposed in such new position, as such tray passes said track means, to return such tray to said predetermined position.

9. In a machine of the class described, an endless conveyor, means for driving said conveyor, a plurality of trays independently supported on said conveyor for movement therewith, hinge means for each tray located upon an axis fixed relative to said conveyor and supporting its tray for oscillation about such axis, latch means for each tray normally cooperating with said hinge means to hold such tray in a predetermined position relative to said conveyor but retractable to permit swinging movement of said tray about said axis to a new position, and stationary track means adjacent the path of said trays cooperable with any tray disposed in such new position, as such tray passes said track means, to return such tray to said predetermined position, each latch means including an element carried on said conveyor and an element carried on a tray, one of said elements being movable relative to the part on which it is carried but resiliently urged toward a predetermined position relative thereto, whereby, when a tray is so returned by the cooperating track means, said elements automatically engage to retain such tray in such predetermined position.

10. In a machine of the class described, a header mounted for oscillation about its own axis, a plurality of tubes communicating with said header, supported thereon, and projecting therefrom in a common direction and in substantially parallel relation, a spray nozzle carried at the free end of each tube, a first lever fixed to said header, means cooperating with said lever to limit oscillatory movement thereof, a second lever journalled for oscillation about the axis of said header, means providing a lost-motion connection between said levers, a valve for controlling fluid flow to said header, said second lever being operatively associated with said valve to open the same upon movement of said second lever beyond a predetermined position, and means for oscillating said second lever.

11. In a machine of the class described, a header mounted for oscillation about its own axis, a plurality of tubes communicating with said header, supported thereon, and projecting therefrom in a common direction and in substantially parallel relation, a spray nozzle carried at the free end of each tube, a first lever fixed to said header, means coperating with said lever to limit oscillatory movement thereof, a second lever journalled for oscillation about the axis of said header, means providing a positive driving connection between said second lever and said first lever in one direction and a resilient driving connection therebetween in the opposite direction, a valve for controlling fluid flow to said header, said valve being normally closed and including an element positioned in the path of said second lever and actuable by said second lever, as said second lever moves in said last-mentioned direction beyond the limiting position of said first lever, to open said valve, and means for oscillating said second lever.

12. In a machine of the class described, an endless conveyor, a plurality of elements carried on said conveyor and arranged thereon in a plurality of ranks extending transversely of the line of movement of said conveyor and said elements further being arranged in a plurality of files extending in the direction of such line, each such element being mounted independently on said conveyor to assume either of two alternative positions relative thereto, a plurality of spray nozzles located at a common station, each such nozzle being arranged in registry with one file of elements, valve means controlling fluid flow to all of said nozzles, actuating means for opening said valve means, a mask for each of said nozzles, independently movable into and out of masking relation therewith, and means dependent upon the position of the element currently registering with each of said nozzles for shifting to non-masking relation the mask of the nozzle registering therewith prior to valve-opening operation of said actuating means.

13. In a machine of the class described, an endless conveyor, a plurality of elements carried on said conveyor and arranged thereon in a plurality of ranks extending transversely of the line of movement of said conveyor and said elements further being arranged in a plurality of files extending in the direction of such line, each such element being mounted independently on said conveyor to assume either of two alternative positions relative thereto, a plurality of spray nozzles located at a common station, each such nozzle being arranged in registry with one file of elements, means for swinging said spray nozzles in unison, about an axis extending transversely of such line of movement, toward and away from the paths of said elements, valve means for controlling fluid flow to all of said nozzles, a mask for each nozzle pivotally carried thereon and movable into and out of masking relation with its nozzle, lever means for each mask having one end pivotally connected to move with such nozzle and its other end operatively connected to its mask at a point eccentric with respect to the pivotal mounting of such mask, each of said elements, when in one of its alternative positions, being cooperative with the lever associated with a registering mask, to swing said mask into non-masking relation with its nozzle as said nozzles approach said plane, and means synchronized with said nozzle-swinging means for opening said valve means after said nozzles reach their position of maximum proximity to said plane.

14. A spray bank comprising a header, a plurality of conduits communicating with said header and projecting therefrom in a common direction, a spray nozzle for each conduit, a mask for each nozzle supported on a pivotal axis movable with its conduit and nozzle, each mask being swingable about its pivotal axis into and out of masking relation with its nozzle, a lever for each mask, each lever being swingable about a pivotal axis movable with its conduit and nozzle and being operatively connected to its mask at a point eccentric with respect to the pivotal axis of its mask, and means resiliently urging each mask toward masking relation with its nozzle, each lever being operable to swing its associated mask into non-masking relation to its nozzle against the tendency of said resilient means.

15. In an egg-separating machine, a conveyor, a series of cups carried by said conveyor and arranged in ranks extending transversely of the line of movement of said conveyor and in files extending in such line of movement, each cup being mounted for independent movement relative to said conveyor between a liquid-retaining position and a liquid-discharging position, means for driving said conveyor, and means actuated by said driving means for automatically delivering a stream of liquid against the interior surface of any cup only if such cup reaches a predetermined position in the line of travel of said conveyor while in a liquid-discharging position.

16. In an egg-separating machine, a conveyor, a series of cups carried by said conveyor and arranged in ranks extending transversely of the line of movement of said conveyor and in files extending in such line of movement, each cup being mounted for independent movement between a liquid-retaining position and a liquid-discharging position, means for driving said conveyor past a cup-washing station, a plurality of liquid-delivery nozzles located at said cup-washing station, one for each file of cups, means common to said nozzles for controlling liquid delivery therethrough, masking means for each nozzle independently movable into and out of masking relation therewith, means for actuating said controlling means each time a rank of cups reaches said washing station, and means, actuated by any cup reaching said station in liquid-discharging position, for shifting the mask associated with the registering nozzle into non-masking relation with its nozzle.

17. In a machine of the class described, an endless conveyor, means for driving said conveyor, a plurality of cupped, egg-separating trays supported on said conveyor, each tray comprising a yolk cup and egg-white-receptacle means, said yolk cup and receptacle means being relatively movable to effect a separation between the yolk and the white of the meat of an egg deposited in said tray, hinge means for each tray located upon an axis fixed relative to said conveyor and supporting its tray for bodily oscillation about said axis, and latch means for each tray normally cooperating with said hinge means to hold such tray in egg-retaining position, said latch means for each tray being individually actuable to free its associated tray for independent bodily movement, about its hinge means, to dumping position.

LAWRENCE M. SIGLER.

References Cited in the file of this patent

UNITED STATES PATENTS

| Number | Name | Date |
| --- | --- | --- |
| 387,241 | McCaslin | Aug. 7, 1888 |
| 2,090,963 | Reese | Aug. 24, 1937 |
| 2,516,499 | Albright | July 25, 1950 |
| 2,521,907 | Gill | Sept. 12, 1950 |

FOREIGN PATENTS

| Number | Country | Date |
| --- | --- | --- |
| 340,543 | Great Britain | Jan. 2, 1931 |